US009660247B2

(12) United States Patent
Takagi

(10) Patent No.: US 9,660,247 B2
(45) Date of Patent: May 23, 2017

(54) SECONDARY BATTERY MANUFACTURING METHOD AND SECONDARY BATTERY

(75) Inventor: Masaru Takagi, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 285 days.

(21) Appl. No.: 14/359,641

(22) PCT Filed: Nov. 23, 2011

(86) PCT No.: PCT/JP2011/076968
§ 371 (c)(1),
(2), (4) Date: May 21, 2014

(87) PCT Pub. No.: WO2013/076831
PCT Pub. Date: May 30, 2013

(65) Prior Publication Data
US 2015/0303441 A1    Oct. 22, 2015

(51) Int. Cl.
*H01M 2/34* (2006.01)
*H01M 2/02* (2006.01)
(Continued)

(52) U.S. Cl.
CPC .......... *H01M 2/345* (2013.01); *H01M 2/02* (2013.01); *H01M 2/0202* (2013.01);
(Continued)

(58) Field of Classification Search
CPC ...... H01M 2/02; H01M 2/0202; H01M 2/345; H01M 2/0237; H01M 4/70; H01M 4/661; H01M 10/0525
See application file for complete search history.

(56) References Cited

U.S. PATENT DOCUMENTS

| 2008/0038627 A1 | 2/2008 | Yamauchi et al. |
| 2010/0167116 A1 | 7/2010 | Okada |

(Continued)

FOREIGN PATENT DOCUMENTS

| CN | 101145624 | 3/2008 |
| JP | 7-99048 | 4/1995 |
| JP | 10-302751 | 11/1998 |
| JP | 11-86822 | 3/1999 |
| JP | 11-195412 | 7/1999 |
| JP | 11-204089 | 7/1999 |
| JP | 2003-338276 | 11/2003 |
| JP | 2004-199938 | 7/2004 |
| JP | 2008-66254 | 3/2008 |

(Continued)

OTHER PUBLICATIONS

Machine Translation of: JP 2010/067541, Takagi, Mar. 25, 2010.*

*Primary Examiner* — Kenneth Douyette
(74) *Attorney, Agent, or Firm* — Finnegan, Henderson, Farabow, Garrett & Dunner, LLP

(57) ABSTRACT

A secondary battery includes, in a battery case, an electrode body having an electrode sheet, a current collecting member including a weld part ultrasonic welded to a current collecting foil of the electrode sheet, and a pressure-type current interrupt mechanism electrically connected to the current collecting member. The current interrupt mechanism has a first valve element integrated with the current collecting member and a second element body, both joined at a joint portion. Of the current collecting member, the first valve element, and the second valve element, at least a part between the weld part and the joint portion is made of damping metal. A method of manufacturing this secondary battery includes: a step of forming a structure in which the first and second valve elements are joined at the joint portion; and a step of thereafter ultrasonic welding the current collecting foil and the weld part.

12 Claims, 6 Drawing Sheets

(51) Int. Cl.
*H01M 2/22* (2006.01)
*H01M 2/26* (2006.01)
*H01M 10/04* (2006.01)
*H01M 4/04* (2006.01)
*H01M 4/66* (2006.01)
*H01M 4/70* (2006.01)
*H01M 10/0525* (2010.01)
*H01M 2/30* (2006.01)

(52) U.S. Cl.
CPC ........... *H01M 2/0237* (2013.01); *H01M 2/22* (2013.01); *H01M 2/26* (2013.01); *H01M 4/04* (2013.01); *H01M 4/661* (2013.01); *H01M 4/70* (2013.01); *H01M 10/0431* (2013.01); *H01M 10/0525* (2013.01); *H01M 2/30* (2013.01); *H01M 2200/20* (2013.01); *H01M 2220/20* (2013.01); *H01M 2220/30* (2013.01)

(56) References Cited

U.S. PATENT DOCUMENTS

2010/0233529 A1 9/2010 Nansaka et al.
2013/0067727 A1 3/2013 Nansaka et al.
2013/0067728 A1 3/2013 Nansaka et al.
2013/0189552 A1 7/2013 Okada

FOREIGN PATENT DOCUMENTS

| JP | 2008-153516 | 7/2008 |
| JP | 2010-67541 | 3/2010 |
| JP | 2010-157451 | 7/2010 |
| JP | 2010-212034 | 9/2010 |

* cited by examiner

SECONDARY BATTERY MANUFACTURING METHOD AND SECONDARY BATTERY

CROSS-REFERENCE TO RELATED APPLICATIONS

This application is a national phase application of International Application No. PCT/JP2011/076968, filed Nov. 23, 2011, the content of which is incorporated herein by reference.

TECHNICAL FIELD

The present invention relates to a method of manufacturing a secondary battery including a pressure-type current interrupt mechanism configured to break current flowing therein in the event that the internal pressure of a battery case exceeds an operating pressure, and also relates to the secondary battery.

BACKGROUND ART

In recent years, secondary batteries (hereinafter, also simply referred to as batteries) typified by lithium ion batteries have been widely used as drive power sources of a hybrid vehicle, an electric vehicle, and others as well as compact electronic devices such as a cellular phone, a notebook-size computer, and a digital camera. In particular, batteries to be used in vehicles such as a hybrid vehicle and an electric vehicle are required to output high power. This requires to increase the size of each battery and connect a plurality of batteries in series or in parallel during use. In a case where the secondary battery is used in a vehicle or the like, particularly high safety is demanded. Regarding such a battery, for example, Patent Document 1 discloses a battery including a pressure-type current interrupt mechanism configured to break current when the internal pressure of a battery case rises, in order to enhance the safety of the battery.

RELATED ART DOCUMENTS

Patent Documents

Patent Document 1: JP-A-2008-66254

SUMMARY OF INVENTION

Problems to be Solved by the Invention

Meanwhile, in such a case where the above secondary battery is configured so that a current collecting foil of an electrode sheet is made of an aluminum foil and a current collecting member is made of an aluminum material, it is difficult to make sure to weld this current collecting foil and the current collecting member to each other by resistance welding. Thus, ultrasonic welding is often used therein.

On the other hand, the pressure-type current interrupt mechanism includes a valve part configured to break or fracture to break current when the internal pressure of a battery case rises. When the current collecting foil of the electrode sheet is connected to the current collecting member by ultrasonic welding, therefore, not only the current collecting member but also a member constituting the valve part of the current interrupt mechanism connected thereto may be largely vibrated by ultrasonic vibration. This ultrasonic vibration may cause breakage of the above valve part, leading to malfunction of the current interrupt mechanism, resulting in deterioration in battery manufacturing yield. Further, even a battery with a valve part having been not broken during manufacture may have been influenced by ultrasonic vibration. This causes a problem in reliability in products (batteries), such as variations in interrupt characteristics. In addition, when batteries are used under inverter control as with the batteries mounted in vehicles, there is a case where micro-vibration or oscillation is caused due to ripple current flowing through the battery during use and transmits to the current interrupt mechanism. This micro-vibration also may deteriorate the durability of the current interrupt mechanism.

The present invention has been made in view of the circumstances and has a purpose to provide a secondary battery including a current interrupt mechanism, i.e., a method of manufacturing a secondary battery with improved yields and capable of preventing malfunction of a current interrupt mechanism due to ultrasonic vibration by ultrasonic welding during manufacture, and a secondary battery with a highly reliable current interrupt mechanism.

Means of Solving the Problems

To achieve the above purpose, one aspect of the invention provides a method of manufacturing a secondary battery including: an electrode body having an electrode sheet including a current collecting foil; a current collecting member including an ultrasonic weld part connected to the current collecting foil of the electrode sheet by ultrasonic welding; a pressure-type current interrupt mechanism conductively connected to the current collecting member; and a battery case hermetically housing the electrode body, the current collecting member, and the current interrupt mechanism, the current interrupt mechanism being configured such that a first valve element integral with the current collecting member and a second valve element are joined to each other at a joint portion, and at least one of the first valve element and the second valve element is moved in a direction to break their joining when internal pressure of the battery case rises, and of the current collecting member, the first valve element, and the second valve element, at least a part between the ultrasonic weld part and the joint portion is made of damping metal, wherein the method comprises: a structure forming step of forming a structure in which the first valve element made integral with the current collecting member and the second valve element are joined to each other at the joint portion; and an ultrasonic welding step of ultrasonic welding the current collecting foil of the electrode sheet and the ultrasonic weld part of the current collecting member after the structure forming step.

The secondary battery according to the above manufacturing method includes the pressure-type current interrupt mechanism configured such that at least one of the first valve element and the second valve element joined through the joint portion is moved in the direction to break their joining when the internal pressure of the battery case rises. In this battery manufacturing method, the structure is formed by connecting the first valve element made integral with the current collecting member to the second valve element at the joint, and then the current collecting foil of the electrode sheet and the current collecting member are connected to each other by ultrasonic welding. Thus, at the time of ultrasonic welding the current collecting foil of the electrode sheet and the current collecting member, there is a risk of breaking the joining of the first valve element and the second valve element (the joint portion or a to-be-broken part) due to the ultrasonic vibration.

In the battery manufacturing method, therefore, of the current collecting member, the first valve element, and the second valve element, at least a part between the ultrasonic weld part and the joint is made of the damping metal. Accordingly, even at the time of ultrasonic welding the current collecting foil of the electrode sheet and the current collecting member to each other, the ultrasonic vibration transmitting from the ultrasonic welded portion to the joint portion is absorbed by the damping metal present in at least a part between the ultrasonic weld part and the joint portion. Thus, it is possible to suppress breakage of joining between the first valve element and the second valve element at the joint portion or breakage of the to-be-broken part due to the transmitted ultrasonic vibration. This makes it possible to prevent malfunction of the current interrupt mechanism during ultrasonic welding and enables manufacturing the secondary battery with high yields. This also can reduce the influence of the ultrasonic vibration on the joint portion and the to-be-broken part such as a notch portion. The secondary battery can be achieved with the current interrupt mechanism having less characteristic variation and high reliability.

In this secondary battery, of the current collecting member, first valve element, and second valve element, at least a part between the ultrasonic weld part and the joint has only to be made of the damping metal. Preferably, all of these current collecting member, first valve element, and second valve element are made of the same damping metal. The first valve element and the current collecting member may also be formed of an integral member made of damping metal.

Examples of the damping metal are: iron-aluminum alloy; M2052 damping alloy containing manganese as a base and additionally including copper, nickel, and iron; cast iron; magnesium alloy; ferrite stainless steel; nickel-titanium alloy, etc.

An example of the joint portion is a portion joining the first valve element and the second valve element by a connecting technique such as welding. The to-be-broken part is a portion provided in the first valve element or the second valve element, and configured to be broken or fractured when the internal pressure rises to thereby remove the joining between the first valve element and the second valve element. For instance, it may be the aforementioned joint, a notch portion formed in the first valve element or the second valve element, a fragile portion such as a thin wall portion formed to be more fragile than other portions.

In the above secondary battery manufacturing method, preferably, the current collecting foil, the current collecting member, the first valve element, and the second valve element are each made of a metal material containing a same metal element, and the damping metal is an alloy of the metal element and a dissimilar metal element different from the metal element.

In this battery manufacturing method, the current collecting foil, the current collecting member, the first valve element, and the second valve element are each made of the metal material containing the same metal element. In addition, the damping metal is an alloy made of the same metal element and a dissimilar metal element (a different type of metal element) different from the former. This can facilitate ultrasonic welding between the current collecting foil and the ultrasonic weld part of the current collecting member. Further, the joining between the first valve element and the second valve element (a configuration of the joint) can also be achieved by the metal materials containing the same metal element. Thus, the secondary battery can be obtained with high reliability in relation to ultrasonic welding and forming the joint portion.

In the above secondary battery manufacturing method, preferably, the first valve element and the second valve element are made of the same damping metal, and the structure forming step includes a welding step of joining the first valve element and the second valve element by welding to form the joint portion.

The structure forming step of the battery manufacturing method includes the step of welding the first valve element and the second valve element, both of which are made of the same damping metal. Since welding is conducted between the same materials, welding reliability can be enhanced. During the ultrasonic welding, the ultrasonic vibration can be absorbed not only by the first valve element but also in the transmitting path from the first valve element to the second valve element through the joint portion. This makes it possible to reliably join the first valve element and the second valve element at the joint portion and also suppress breakage of the joint portion between the first valve element and the second valve element of the current interrupt mechanism or breakage of the to-be-broken part due to the ultrasonic vibration during the ultrasonic welding. Thus, the secondary battery can be manufactured with higher yields. It is further possible to reduce the influence of the ultrasonic vibration on the joint portion and the to-be-broken part such as the notch portion. The secondary battery can therefore be achieved with more reliable current interrupt mechanism.

In one of the above secondary battery manufacturing methods, preferably, the first valve element and the current collecting member are formed of an integral member made of the damping metal.

This battery manufacturing method uses the first valve element and the current collecting member which are formed of the integral member made of the damping metal. This configuration can eliminate the necessary to join the first valve element and the current collecting member by welding or other technique and thus realize cost reduction. In addition, the ultrasonic vibration can be absorbed not only by the first valve element but also by the current collecting member. This enables more reliably suppressing breakage of the joining between the first valve element and the second valve element of the current interrupt mechanism at the joint portion or breakage of the to-be-broken part due to the ultrasonic vibration during the ultrasonic welding. Accordingly, the secondary battery can be manufactured with higher yields. It is further possible to reduce the influence of the ultrasonic vibration on the joint portion and the to-be-broken part. The secondary battery can therefore be provided with more reliable current interrupt mechanism.

To achieve the above purpose, another aspect of the invention provides a secondary battery including: an electrode body having an electrode sheet including a current collecting foil; a current collecting member including an ultrasonic weld part connected to the current collecting foil of the electrode sheet by ultrasonic welding; a pressure-type current interrupt mechanism conductively connected to the current collecting member; and a battery case hermetically housing the electrode body, the current collecting member, and the current interrupt mechanism, the current interrupt mechanism being configured such that a first valve element integral with the current collecting member and a second valve element are joined to each other at a joint portion, and at least one of the first valve element and the second valve element is moved in a direction to break their joining when internal pressure of the battery case rises, and of the current collecting member, the first valve element, and the second valve element, at least a part between the ultrasonic weld part and the joint portion is made of damping metal.

This battery is configured such that, of the current collecting member, the first valve element, and the second valve element, at least a part located between the ultrasonic weld part and the joint is made of the damping metal, and further the current collecting foil of the electrode sheet and the current collecting member are connected by ultrasonic welding. Accordingly, during ultrasonic welding between the current collecting foil of the electrode sheet and the current collecting member, the ultrasonic vibration transmitting from the ultrasonic weld part toward the joint portion is absorbed by at least the part between the ultrasonic weld part and the current collecting member. Consequently, it is possible to suppress breakage of the joining between the first valve element and the second valve element at the joint portion or breakage of the to-be-broken part during ultrasonic welding and further reduce the influence of the ultrasonic welding on the joint portion and the to-be-broken part. Thus, the secondary battery can be provided with the current interrupt mechanism having less characteristic variation and high reliability.

Meanwhile, when a battery is used under inverter control, micro-vibration may be generated in the electrode body due to ripple current flowing in the battery. In the above battery, however, the micro-vibration caused by ripple current can also be absorbed by at least the part between the ultrasonic weld part and the joint portion. Accordingly, it is also possible to reduce the influence of the micro-vibration on the durability of the current interrupt mechanism. From this point of view, the secondary battery can be provided with the highly reliable current interrupt mechanism.

In the above secondary battery, further preferably, the current collecting foil, the current collecting member, the first valve element, and the second valve element are each made of a metal material containing a same metal element, and the damping metal is an alloy of the metal element and a dissimilar metal element different from the metal element.

In the above battery, the current collecting foil, the current collecting member, the first valve element, and the second valve element are each made of the metal material containing the same metal element. In addition, the damping metal is an alloy made of the same metal element and a dissimilar metal element different from the former. This allows ultrasonic welding between the current collecting foil and the ultrasonic weld part of the current collecting member and mutual joining between the first valve element and the second valve element (the configuration of the joint) to be performed between the metal materials containing the same metal element. Reliability of welding and joining is thus good. The secondary battery can therefore be provided with the ultrasonic weld part and the joint portion with high reliability.

In the above secondary battery, further preferably, the first valve element and the second valve element are made of the same damping metal and are joined to each other by welding to form the joint portion.

The above battery is configured such that the first valve element and the second valve element are made of the same damping metal and they are joined by welding to form the joint portion. Since the welding is performed between the same materials, welding reliability is good. Even if micro-vibration is generated due to ripple current or the like during use of the battery, this vibration can be absorbed not only by the first valve element but also in the transmitting path toward the second valve element. The thus configured secondary battery can be provided with the current interrupt mechanism having higher reliability.

In one of the above secondary batteries, further preferably, the first valve element and the current collecting member are formed of an integral member made of the damping metal.

This battery is configured such that the first valve element and the current collecting member are formed of the integral member made of the damping metal. Even when micro-vibration occur due to ripple current or the like during use of the battery, not only the first valve element can absorb the micro-vibration but also the current collecting member can absorb the micro-vibration.

In the above secondary battery, further preferably, the current collecting foil is an aluminum foil, and the damping metal is a damping iron-aluminum alloy.

The above battery is configured such that damping iron-aluminum alloy is used as the damping metal forming the integral member including the first valve element and the current collecting member. This damping iron-aluminum alloy can satisfactorily be ultrasonic welded to aluminum. This enables appropriate ultrasonic welding of the current collecting member made of the damping aluminum alloy to the aluminum foil formed of the current collecting foil. The above battery can be achieved as the secondary battery configured such that the current collecting foil is excellently ultrasonic welded to the current collecting member even through it is made of the damping metal.

In the above secondary battery, further preferably, the damping iron-aluminum alloy contains 6 to 10 wt % of aluminum and a reminder including iron and inevitable impurities.

Of the iron-aluminum alloy, an alloy containing 6 to 10 wt % of aluminum and the reminder including iron and inevitable impurities has particularly good vibration damping characteristics as the damping alloy. Accordingly, the secondary battery can be provided with more reliable current interrupt mechanism.

MODE FOR CARRYING OUT THE INVENTION

First Embodiment

Figure 1:
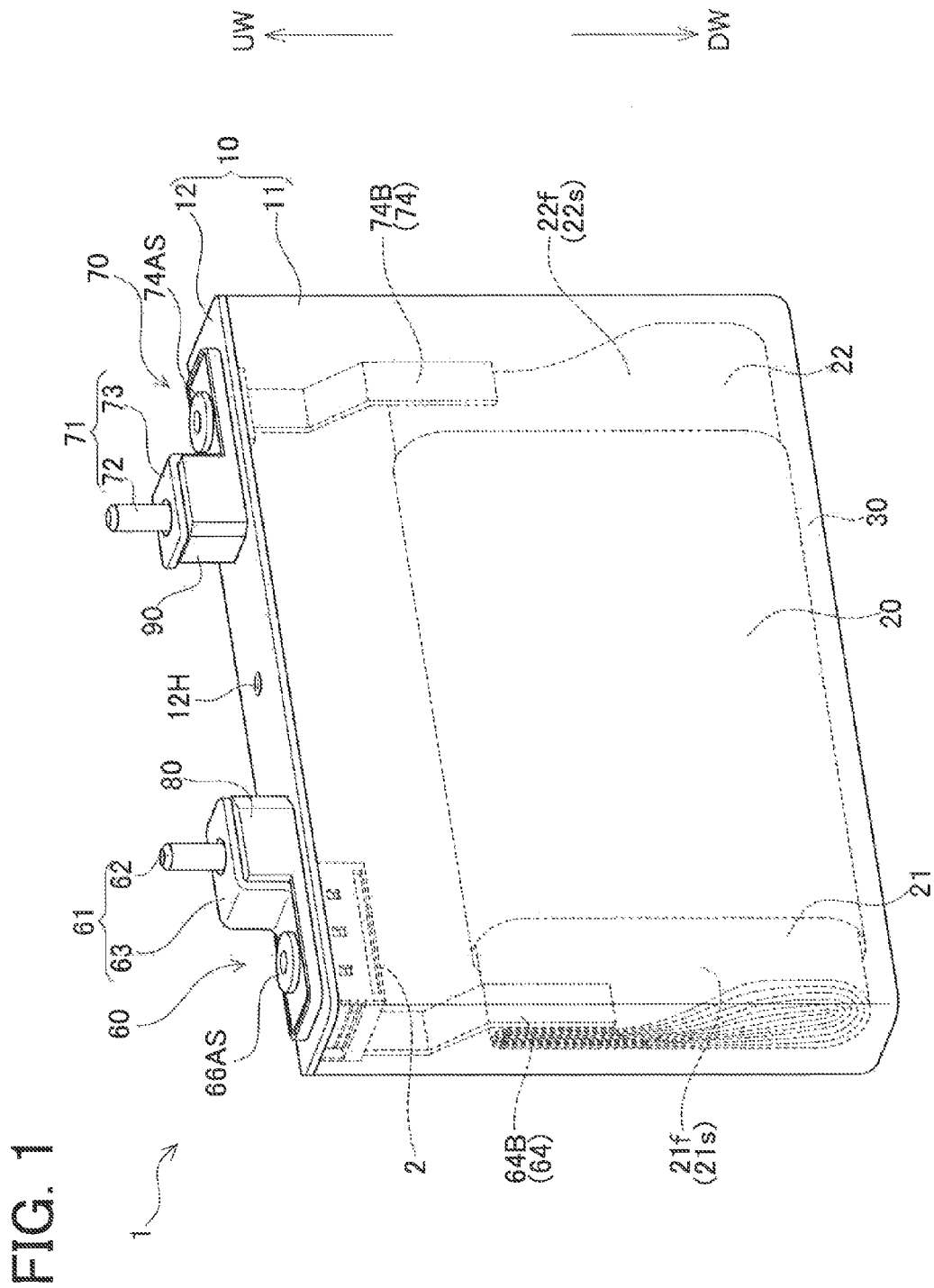
FIG. 1 is a perspective view of a lithium ion secondary battery in a first embodiment.

A detailed description of a preferred embodiment of the present invention will now be given referring to the accompanying drawings. FIG. 1 is a perspective view of a lithium ion secondary battery 1 (hereinafter, also simply referred to as a battery 1) in a first embodiment. The configuration of the battery 1 is briefly explained first. The following explanation is given by assuming an upper part in each figure as an upper side UW (upward UW) of the battery 1 and a lower part as a lower side DW (downward DW) of the battery 1. This battery 1 includes an electrode body 20 having a positive electrode sheet 21 and a negative electrode sheet 22, a non-aqueous electrolyte 30, a rectangular battery case 10 hermetically containing the electrode body 20 and the electrolyte 30, a positive terminal 60 connected to the positive electrode sheet 21 and extended out of the battery case 10, and a negative terminal 70 connected to the negative electrode sheet 22 and extended out of the battery case 10.

The battery case 10 includes a case body member 11 having an opening and a closing lid 12. This closing lid 12 has a rectangular plate shape and is welded to the case body member 11 to close the opening of this case body member 11. The closing lid 12 is provided with a liquid inlet 12H through which the electrolyte 30 is poured. Furthermore, a positive external terminal 61 constituting a part of the positive terminal 60 and a negative external terminal 71 constituting a part of the negative terminal 70 are respectively fixedly provided on the outside of the battery case 10. The positive external terminal 61 includes a bolt 62 and a positive external terminal member 63 formed of an aluminum plate bent in a crank shape (a Z shape). They are fixed to the closing lid 12 through an outer gasket 80 made of resin. The negative external terminal 71 includes a bolt 72 and a negative external terminal member 73 formed of a copper plate bent in a crank shape (a Z shape). they are fixed to the closing lid 12 through an outer gasket 90 made of resin.

The electrode body 20 is enclosed in an insulating film envelope (not shown) formed of a bag-shaped insulating film and is accommodated sideways in the battery case 10. This electrode body 20 consists of a strip-shaped positive electrode sheet 21 and a strip-shaped negative electrode sheet 22 that are wound together in layers by interposing strip-shaped separators (not shown) therebetween, and compressed into a flattened shape.

The positive electrode sheet 21 includes, as a core material, a positive current collecting foil 21s made of a strip-shaped aluminum foil. This positive current collecting foil 21s is provided, on each surface, with a positive active material layer (not shown) made of positive active material, conductive material, and binding material. One side of the current collecting foil 21s serves as a positive lead portion 21f in which the positive active material layer is not present. In other words, the positive lead portion 21f is a portion of the positive electrode sheet 21 in which the positive current collecting foil 21s made of an aluminum foil is exposed.

The negative electrode sheet 22 includes, as a core material, a negative current collecting foil 22s made of a strip-shaped copper foil. This negative current collecting foil 22s is provided, on each surface, with a negative active material layer (not shown) made of negative active material, conductive material, and binding material. One side of the negative current collecting foil 22s serves as a negative lead portion 22f in which the negative active material layer is not present. In other words, the negative lead portion 22f is a portion of the negative electrode sheet 22 in which the negative current collecting foil 22s made of a copper foil is exposed.

Figure 3:
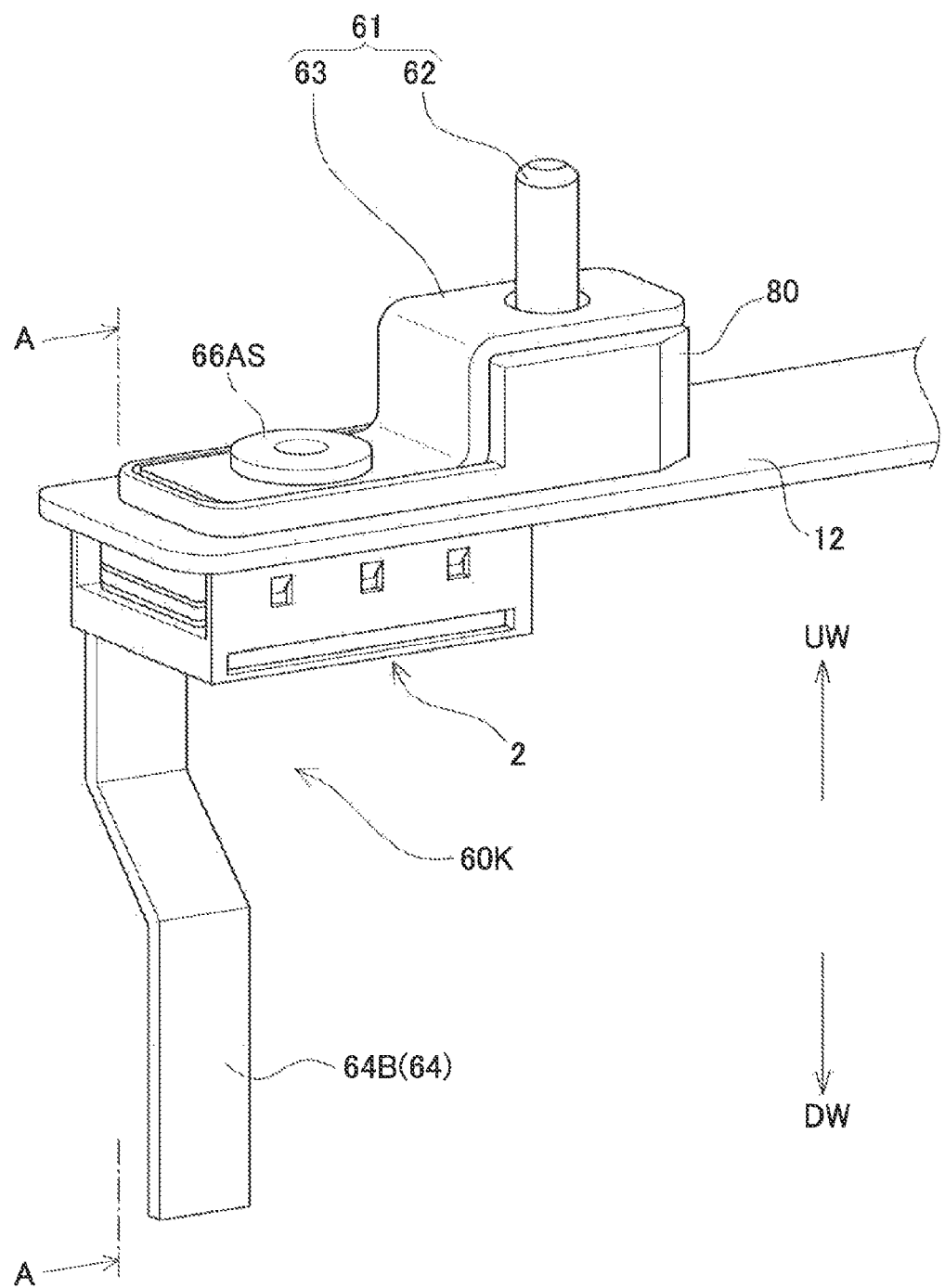
FIG. 3 is a perspective view showing a configuration of a positive terminal including a current interrupt mechanism in the first embodiment.
Figure 4:
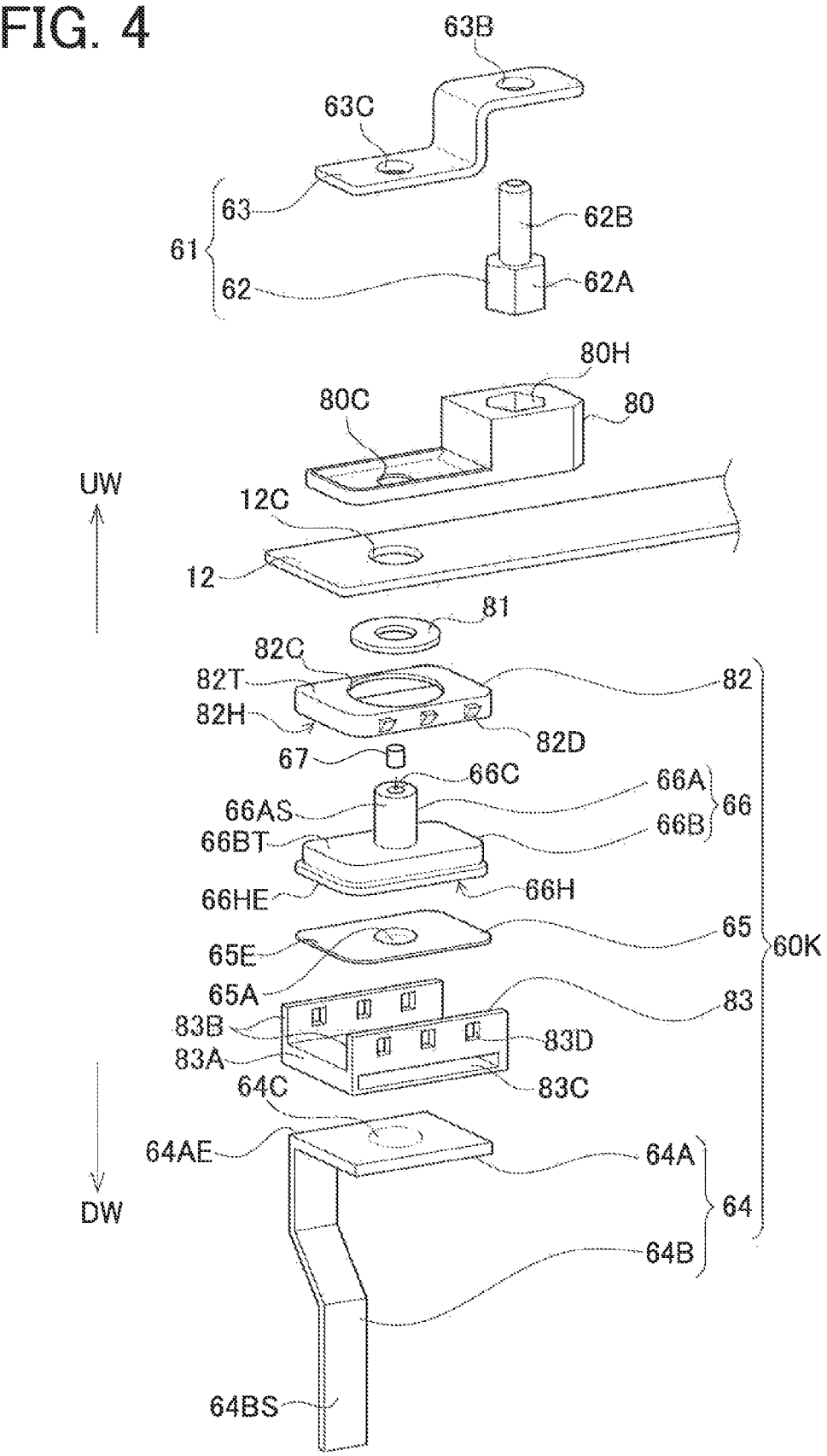
FIG. 4 is an exploded perspective view showing a configuration of a positive terminal including the current interrupt mechanism in the first embodiment.
Figure 5:
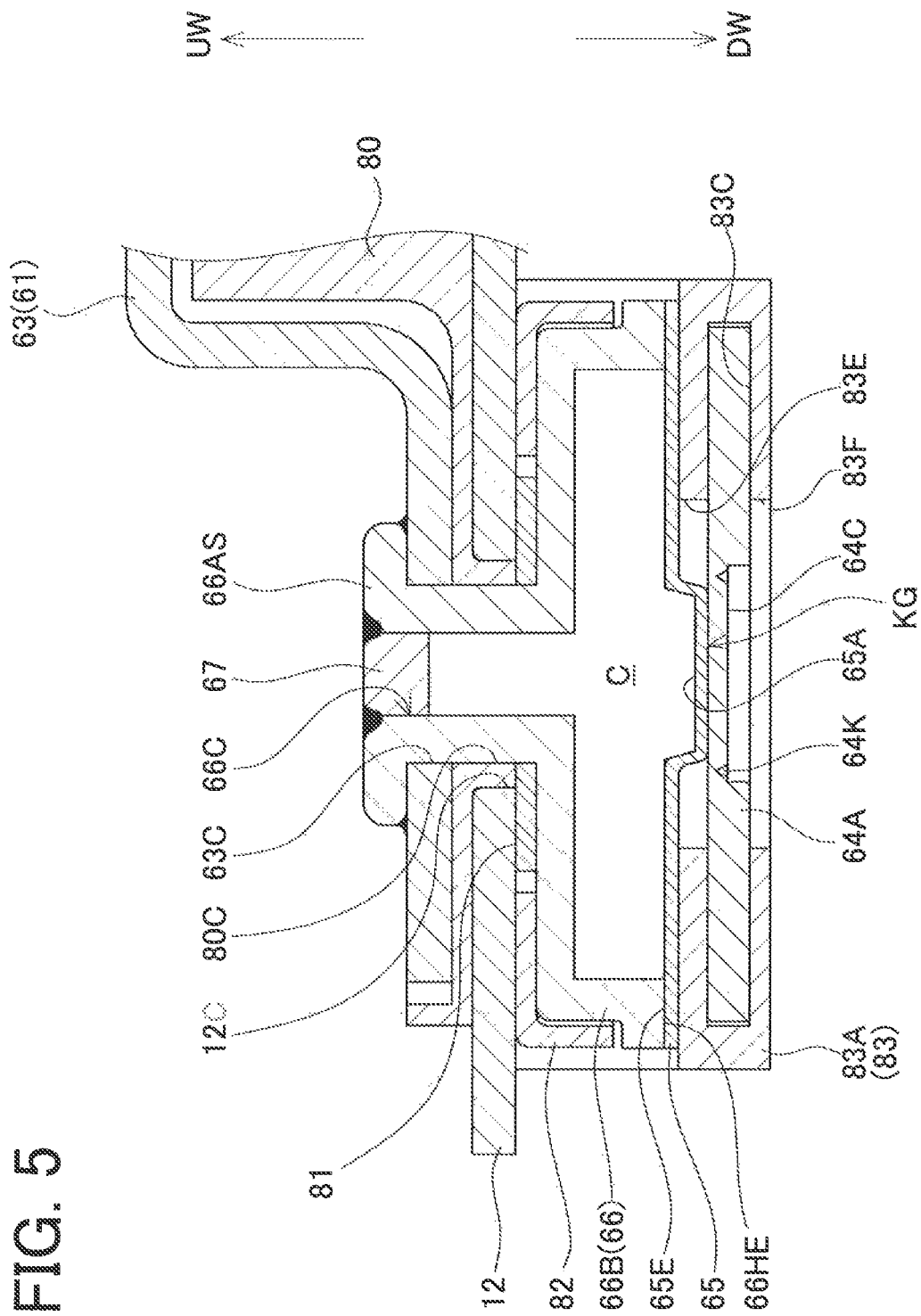
FIG. 5 is a longitudinal cross sectional view of the current interrupt mechanism taken along a line A-A in FIG. 3 in the first embodiment.

Of the electrode body 20, the positive lead portion 21f (the positive current collecting foil 21s) of the positive electrode sheet 21 is connected to the positive terminal 60 (see FIGS. 1, 3, and 4). This positive terminal 60 includes the aforementioned positive external terminal 61 placed outside the battery case 10, and further a current interrupt mechanism 2 and a positive current collecting member 64B which are located inside the battery case 10. The positive current collecting member 64B is a part of a positive internal conductive member 64 which will be mentioned later. This positive internal conductive member 64 is made of damping iron-aluminum (Fe—Al) alloy. The positive current collecting member 64B has a crank-like bent shape and is welded by ultrasonic welding to the positive lead portion 21f (the positive current collecting foil 21s) of the positive electrode sheet 21.

The current interrupt mechanism 2 is placed in the battery case 10 and interposed between the positive current collecting member 64B and the positive external terminal 61 (the positive external terminal member 63) to allow electric conduction therebetween. This current interrupt mechanism 2 is a pressure-type safety mechanism to interrupt or cut off charge/discharge current Id flowing through the current interrupt mechanism 2 when the internal pressure Pi of the battery case 10 exceeds an operating pressure Pf.

Figure 2:
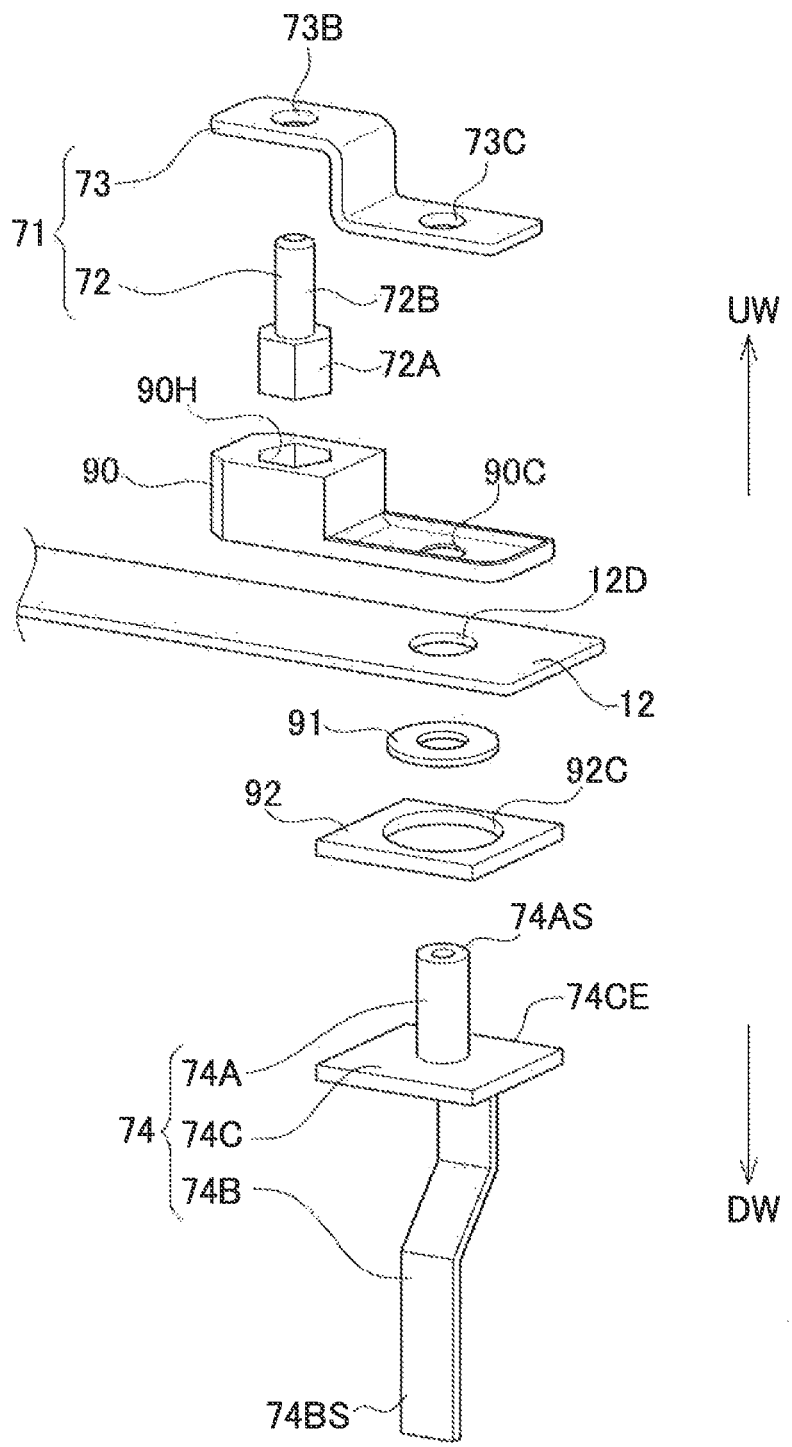
FIG. 2 is an exploded perspective view showing a configuration of a negative terminal in the first embodiment.

On the other hand, the negative lead portion 22f (the negative current collecting foil 22s) of the negative electrode sheet 22 is connected to the negative terminal 70 (see FIGS. 1 and 2). This negative terminal 70 includes the aforementioned negative external terminal 71 placed outside the battery case 10 and further a negative current collecting member 74B located inside the battery case 10. The negative current collecting member 74B is a part of a negative internal conductive member 74 mentioned later. This negative internal conductive member 74 is made of copper. The negative current collecting member 74B has a crank-like bent shape and is welded by resistance welding to the negative lead portion 22f (the negative current collecting foil 22s) of the negative electrode sheet 22.

The configuration of the positive terminal 60 will be explained below in detail (see FIGS. 1, 3, 4, and 5). The closing lid 12 of the battery case 10 has a positive through hole 12C in which the positive external terminal 61 consisting of the bolt 62 and the positive external terminal member 63 is fixed through the outer gasket 80 as explained above.

The outer gasket 80 has a nearly L shape including a bolt retaining hole 80H formed as a hexagonal columnar recess and a through hole 80C. The positive external terminal member 63 has two through holes 63B and 63C. The bolt 62 has a hexagonal columnar head portion 62A inserted in the bolt retaining hole 80H of the outer gasket 80 and a screw portion 62B passed through the through hole 63B of the positive external terminal member 63. The other through hole 63C of the positive external terminal member 63 together with the through hole 80C of the outer gasket 80 is coaxially aligned with the positive through hole 12C of the closing lid 12.

On the other hand, the current interrupt mechanism 2 is arranged in the battery case 10 on the lower side DW in the figure of the positive through hole 12C. This current interrupt mechanism 2 includes an annular plate-shaped seal rubber 81, a first inner gasket 82 made of resin, a sealing stopper 67, a space forming member 66, a plate-shaped second valve element 65, a second inner gasket 83 made of resin, and a positive internal conductive member 64. The positive internal conductive member 64 includes a first valve element 64A and the positive current collecting member 64B.

The space forming member 66 is made of aluminum and consists of a space forming portion 66B of a rectangular tubular shape having a bottom and having an opening 66H on the lower side DW in the figure and a cylindrical caulking portion 66A extending from the space forming portion 66B on the upper side UW in the figure. The caulking portion 66A is internally formed with a tube hole 66C opening into the space forming portion 66B. This tube hole 66C is closed with the sealing stopper 67 made of aluminum as explained later.

The first inner gasket 82 made of resin has a rectangular cylindrical shape having a bottom and having an opening 82H on the lower side DW in the figure. A bottom 82T on the upper side UW in the figure is formed at its center with a circular hole 82C having a larger diameter than the outer diameter of the seal rubber 81. The seal rubber 81 can be set in the circular hole 82C. The first inner gasket 82 is configured to externally fit on the space forming portion 66B of the space forming member 66 through the opening 82H on the lower side DW in the figure. The first inner gasket 82 is further provided, on each of two opposite side surfaces, with three protruding engagement lugs 82D to be used for engagement with the second inner gasket 83.

On the other hand, the second inner gasket 83 includes a rectangular body portion 83A in plan view on the lower side DW in the figure and side walls 83B standing from two side edges of the body portion 83A toward the upper side UW in the figure. The body portion 83A has a holding slit 83C formed therethrough to provide a rectangular space in which the first valve element 64A mentioned later is insertable. In addition, a circular hole 83E and a circular hole 83F are formed through the body portion 83A at its center area in plan view so that the holes 83E and 83F are respectively located on the upper side UW and the lower side DW in the figure separated by the holding slit 83C (see FIG. 5). The two side walls 83B are provided with engagement holes 83D formed three in each of the side walls 83B. When the engagement holes 83D are engaged with the engagement lugs 82D of the first inner gasket 82, the second inner gasket 83 can be locked to the first inner gasket 82.

The first inner gasket 82 is externally fit on the space forming portion 66B of the space forming member 66 and also the caulking portion 66A of the space forming member 66 is inserted, through the first inner gasket 82 and the seal rubber 81 set therein, into the positive through hole 12C of the closing lid 12, the through hole 80C of the outer gasket 80, and the through hole 63C of the positive external terminal member 63. Furthermore, a leading end portion 66AS of the caulking portion 66A is deformed to expand the diameter and caulked to the positive external terminal member 63, and then welded thereto by laser. Thus, the space forming member 66 is fixed to the closing lid 12.

Of the space forming portion 66B of the space forming member 66, an open end 66HE of the opening 66H is hermetically closed by the second valve element 65 by laser welding, thereby forming an internal space C defined by the space forming member 66 and the second valve element 65. This internal space C is made vacuum and the tube hole 66C of the caulking portion 66A of the space forming member 66 is sealed by the sealing stopper 67. This stopper 67 is welded by laser to the leading end portion 66AS of the caulking portion 66A. The second valve element 65 has a nearly rectangular plate shape and is made of damping iron-aluminum alloy of Fe-8 wt % Al.

This second valve element 65 includes, at the center, a protrusion 65A protruding downward in the figure. This protrusion 65A is connected by welding to the first valve element 64A of the positive internal conductive member 64 mentioned later. Of the space forming member 66 and the second valve element 65, the space forming member 66 is externally attached with the first inner gasket 82 from the upper side UW in the figure as mentioned above. Furthermore, the second inner gasket 83 is attached to the space forming member 66 from the lower side DW in the figure. The engagement holes 83D of the second inner gasket 83 are engaged with the engagement lugs 82D of the first inner gasket 82. Accordingly, when the space forming member 66 and the second valve element 65 are sandwiched between the first inner gasket 82 and the second inner gasket 83, the second inner gasket 83 is held suspending from the first inner gasket 82.

The positive internal conductive member 64 integrally includes the rectangular plate-shaped first valve element 64A located on the upper side UW in the figure and the positive current collecting member 64B bent in a crank shape extending downward DW in the figure from one side edge 64AE of the first valve element 64A. This positive internal conductive member 64 is also formed of an integral member made of damping iron-aluminum alloy of Fe-8 wt % Al. Accordingly, the positive internal conductive member 64 and the second valve element 65 are made of the same damping iron-aluminum alloy. This damping iron-aluminum alloy exhibits particularly favorable vibration damping characteristics and also allows good ultrasonic welding with aluminum.

The positive internal conductive member 64 is configured such that the first valve element 64A is inserted in the holding slit 83C of the second inner gasket 83 and held suspending from the second inner gasket 83. The circular central portion 64C of the first valve element 64A is formed with a thickness thinner than a surrounding portion thereof and connected by laser welding to the protrusion 65A of the second valve element 65, which form a joint portion KG. In addition, the peripheral edge of the central portion 64C of the first valve element 64A is provided with an annular notch portion 64K like a V-shaped groove which is a to-be-broken portion that will be broken as mentioned later.

The internal space C defined by the space forming member 66 and the second valve element 65 is made vacuum and the tube hole 66C of the caulking portion 66A of the space forming member 66 is sealed by the sealing stopper 67, and then the sealing stopper 67 is laser welded to the leading end portion 66AS of the caulking portion 66A. When the internal pressure Pi of the battery case 10 rises, the second valve element 65 is deformed into a concave shape, causing the protrusion 65A to move upward UW in the figure. When the internal pressure Pi exceeds the operating pressure Pf, the notch portion 64K of the first valve element 64A is broken or split, thereby removing the joining between the first valve element 64A and the second valve element 65. In this manner, the pressure-type current interrupt mechanism 2 is constructed of the first valve element 64A, the second valve element 65, and the space forming member 66 which are main constituent components. The positive external terminal 61, the current interrupt mechanism 2, and the positive internal conductive member 64 are fixed to the closing lid 12 and they form the positive terminal 60. The positive internal conductive member 64 is ultrasonic welded, through a leading end portion 64BS (an ultrasonic welded portion) of the positive current collecting member 64B, to the positive lead portion 21f (the positive current collecting foil 21s) of the positive electrode sheet 21.

Next, the configuration of the negative terminal 70 will be explained in detail (see FIGS. 1 and 2). The closing lid 12 of the battery case 10 has a negative through hole 12D in which the negative external terminal 71 consisting of the bolt 72 and the negative external terminal member 73 is fixed through the outer gasket 90.

The outer gasket 90 has a nearly L shape including a bolt retaining hole 90H formed as a hexagonal columnar recess and a through hole 90C. The negative external terminal member 73 has two through holes 73B and 73C. The bolt 72 has a hexagonal columnar head portion 72A inserted in the bolt retaining hole 90H and a screw portion 72B passed through the through hole 73B of the negative external terminal member 73. The through hole 73C together with the through hole 90C of the outer gasket 90 is coaxially aligned with the negative through hole 12D of the closing lid 12.

On the other hand, in the battery case 10 on the lower side DW in the figure of the negative through hole 12D, there are arranged an annular plate-shaped seal rubber 91, an inner gasket 92 made of resin, and a negative internal conductive member 74. The negative internal conductive member 74 integrally includes a rectangular-plate-shaped base portion 74C, a cylindrical caulking portion 74A extending upward UW in the figure from the plate-shaped base portion 74C, and a negative current collecting member 74B bent in a crank shape extending downward DW in the figure from one side edge 74CE of the plate-shaped base portion 74C. The inner gasket 92 has a rectangular plate shape formed at its center with a circular hole 92C having a larger diameter than the outer diameter of the seal rubber 91 so that the seal rubber 91 is set in the circular hole 92C.

The plate-shaped base portion 74C of the negative internal conductive member 74 is placed in contact with both the inner gasket 92 and the seal rubber 91 set therein, so that the caulking portion 74A is passed therethrough into the negative through hole 12D of the closing lid 12, the through hole 90C of the outer gasket 90, and the through hole 73C of the negative external terminal member 73. A leading end portion 74AS of the caulking portion 74A is deformed to expand the diameter and caulked to the negative external terminal member 73 and then laser welded thereto. Accordingly, the negative internal conductive member 74 is fixed to the closing lid 12. The negative external terminal 71 and the negative internal conductive member 74 are fixed to the closing lid 12. This assembly constitutes the negative terminal 70. The negative internal conductive member 74 is connected by resistance welding to the negative lead portion 22f (the negative current collecting foil 22s) of the negative electrode sheet 22 through a leading portion 74BS of the negative current collecting member 74B.

As explained above, the battery 1 is configured such that the positive internal conductive member 64 which is an integral member consisting of the positive current collecting member 64B and the first valve element 64A is made of damping iron-aluminum alloy, and further the positive current collecting foil 21s of the positive electrode sheet 21 and the positive current collecting member 64B are connected to each other by ultrasonic welding. Thus, while the positive current collector 21s of the positive electrode sheet 21 and the positive current collecting member 64B are subjected to ultrasonic welding, the ultrasonic vibration transmitting from the leading end portion 64BS (a ultrasonic weld part) of the positive current collecting member 64B toward the joint portion KG is absorbed by the one-piece positive internal conductive member 64. This prevents breakage of joining between the first valve element 64A and the second valve element 65 at the joint portion KG or the notch portion 64K during ultrasonic welding. In addition, this can reduce the influence of the ultrasonic vibration on the joint portion KG or the notch portion 64K. Thus, the battery 1 can be achieved with the current interrupt mechanism 2 having less characteristic variations and high reliability.

Meanwhile, in a case where the battery 1 is mounted in a hybrid vehicle or an electric vehicle and used for motor driving, the battery 1 may be used under inverter control. In this case, ripple current flowing in the battery 1 may generate micro-vibration in the electrode body 20. In this battery 1, however, the micro-vibration due to the ripple current can be absorbed by the positive internal conductive member 64. Accordingly, it is possible to reduce the influence of the micro-vibration on the durability of the current interrupt mechanism 2. From this point of view, the battery 1 can be provided with the high-reliable current interrupt mechanism 2.

Furthermore, the battery 1 is configured such that the first valve element 64A and the second valve element 65 are made of the same damping metal and they are connected to each other by welding, thus forming the joint portion KG. Since this welding is performed between the same material components, good welding reliability is obtained. Even when micro-vibration is caused due to ripple current or the like during use of the battery 1, such micro-vibration can be absorbed not only by the positive internal conductive member 64 but also in a transmitting path toward the second valve element 65. Accordingly, the battery 1 can be provided with the current interrupt mechanism 2 having higher reliability.

Moreover, in the battery 1, the damping metal forming the positive internal conductive member 64 integrally consisting of the first valve element 64A and the positive current collecting member 64B is damping iron-aluminum alloy of Fe-8 wt. % Al. This iron-aluminum alloy has particularly good vibration damping characteristics and also allows good ultrasonic welding with aluminum. This makes it possible to appropriately ultrasonic weld the positive internal conductive member 64 consisting of the positive current collecting member 64B and the first valve element 64A both made of the iron-aluminum alloy to the aluminum foil forming the positive current collecting foil 21s. Thus, the battery 1 can be achieved with the positive internal conductive member 64 made of the damping metal so that the positive current collecting member 64B and the positive current collecting foil 21s are properly ultrasonic welded to each other while keeping higher reliability of the current interrupt mechanism 2.

Next, a method of manufacturing the battery 1 in the first embodiment will be explained. Forming the electrode body 20 is first explained. Both surfaces of an aluminum foil (the positive current collecting foil 21s) are applied with positive electrode paste containing positive active material particles (not shown) made of lithium composite oxide so that the positive lead portion 21f is left on one side. This foil is then dried and pressed, producing the positive electrode sheet 21. On the other hand, both surfaces of a copper foil (the negative current collecting foil 22s) are applied with negative electrode paste containing negative active material particles (not shown) made of natural graphite so that the negative lead portion 22f is left on one side. This foil is then dried and pressed, producing the negative electrode sheet 22. Subsequently, the positive electrode sheet 21 and the negative electrode sheet 22 are wound together by interposing separators (not shown) therebetween and compressed into a flattened shape, thereby forming the electrode body 20.

In a separate process from the above, on the closing lid 12 of the battery case 10, the positive terminal 60 including the positive external terminal 61, the current interrupt mechanism 2, and the positive internal conductive member 64 is fixedly provided and also the negative terminal 70 including the negative external terminal 71 and the negative internal conductive member 74 is fixedly provided.

Fixedly providing each member constituting the negative terminal 70 will be explained first. The head portion 72A of the bolt 72 is inserted in the bolt retaining hole 90H of the outer gasket 90, and the screw portion 72B is passed through the one through hole 73B of the negative external terminal member 73. The other through hole 73C of the negative external terminal member 73 together with the through hole 90C of the outer gasket 90 is coaxially aligned with the negative through hole 12D of the closing lid 12. The cylindrical caulking portion 74A of the negative internal conductive member 74 is passed through the inner gasket 92 and the seal rubber 91, and further passed through the negative through hole 12D of the aforementioned closing lid 12, the through hole 90C of the outer gasket 90, and the through hole 73C of the negative external terminal member 73. The leading portion 74AS of the caulking portion 74A is deformed to expand the diameter and caulked to the negative external terminal member 73, and then welded thereto by laser. In the above manner, each of the members forming the negative terminal 70 is fixedly provided on the closing lid 12.

Next, fixedly providing each member constituting the positive terminal 60 including the current interrupt mechanism 2 will be explained. Of the space forming portion 66B of the space forming member 66, the open end 66HE of the opening 66H is hermetically joined by laser welding to the peripheral edge 65E of the second valve element 65. Further, of the welded space forming member 66 and second valve element 65, the space forming member 66 is externally attached with the first inner gasket 82 from the upper side UW in the figure. In addition, the second inner gasket 83 is externally attached thereto from the lower side DW in the figure so that the space forming member 66 and the second valve element 65 are sandwiched between the first inner gasket 82 and the second inner gasket 83, and the engagement holes 83D of the second inner gasket 83 are engaged with the engagement lugs 82D of the first inner gasket 82.

The first valve element 64A of the positive internal conductive member 64 is inserted in the holding groove 83C of the second inner gasket 83, placing the central portion 64C of the first valve element 64A into contact with the protrusion 65A of the second valve element 65, and joining them by laser welding (a welding step) to form the joint portion KG. Accordingly, a structure 60K is made up of the space forming member 66, the first inner gasket 82, and the second inner gasket 83 is produced in addition to the positive internal conductive member 64 integrally consisting of the positive current collecting member 64B, the first valve element 64A, the second valve element 65 (a structure forming step).

The head portion 62A of the bolt 62 is inserted in the bolt retaining hole 80H of the outer gasket 80 and the screw portion 62B is passed through the one through hole 63B of the positive external terminal member 63. The other through hole 63C of the positive external terminal member 63 together with the through hole 80C of the outer gasket 80 is coaxially aligned with the positive through hole 12C of the closing lid 12. The caulking portion 66A of the space forming member 66 of the structure 60K is passed through the seal rubber 81, and further passed through the positive through hole 12C of the closing lid 12, the through hole 80C of the outer gasket 80, and the through hole 63C of the positive external terminal member 63. Furthermore, the leading end portion 66AS of the caulking portion 66A is expanded in diameter and caulked, and then the positive external terminal member 63 and the leading end portion 66AS of the caulking portion 66A are welded to each other by laser.

The internal space C defined by the space forming member 66 and the second valve element 65 of the structure 60K is made vacuum and thereafter the tube hole 66C of the caulking portion 66A of the space forming member 66 is sealed by the sealing stopper 67. Furthermore, the sealing stopper 67 is joined to the leading end portion 66AS of the caulking portion 66A by laser welding. Thus, each member forming the positive terminal 60 is fixedly provided on the closing lid 12.

Subsequently, the positive current collecting member 64B of the positive internal conductive member 64 and the negative current collecting member 74B of the negative internal conductive member 74, both of which are made integral with the closing lid 12, are connected to the electrode body 20. To be concrete, the negative current collecting member 74B made of copper is connected by resistance welding to the negative lead portion 22f (the negative current collecting foil 22s) of the negative electrode sheet 22. On the other hand, the positive current collecting member 64B is connected by ultrasonic welding to the positive lead portion 21f (the positive current collecting foil 21s) of the positive electrode sheet 21 (ultrasonic welding step). Herein, the positive internal conductive member 64, which includes the positive current collecting member 64B and the first valve element 64A, and the second valve element 65 are both made of damping iron-aluminum alloy of Fe-8 wt % Al, as explained above. Accordingly, the ultrasonic vibration in ultrasonic welding is absorbed by the second valve element 65 as well as the positive current collecting member 64B and the first valve element 64A. This can prevent breakage of the joint portion KG between the first valve element 64A and the second valve element 65 or breakage of the notch portion 64K due to ultrasonic vibration.

Successively, the electrode body 20 is accommodated in the case body member 11, this case body member 11 is closed by the closing lid 12, and the closing lid 12 is laser welded to the case body member 11. Thereafter, the electrolyte 30 is supplied through the liquid inlet 12H of the closing lid 12 and then the liquid inlet 12H is sealed. This battery 1 is subsequently subjected to initial charge and discharge. Thus, the battery 1 is completed.

As explained above, of the positive current collecting member 64B, the first valve element 64A, and the second valve element 65, at least a part between the leading end portion 64BS (the ultrasonic weld part) of the positive current collecting member 64B and the joint portion KG (in the first embodiment, the positive internal conductive member 64 integrally including the positive current collecting member 64B and the first valve element 64A, and the second valve element 65) are made of damping metal (damping iron-aluminum alloy). Accordingly, even when the positive current collecting foil 21s of the positive electrode sheet 21 is ultrasonic welded to the positive current collecting member 64B, the ultrasonic vibration transmitting from the leading end portion 64BS of the positive current collecting member 64B toward the joint portion KG is absorbed by at least this part therebetween (the positive internal conductive member 64 in the first embodiment). This makes it possible to prevent the joining between the first valve element 64A and the second valve element 65 from becoming broken at the joint portion KG or the notch portion 64K due to the transmitted ultrasonic vibration. Accordingly, during ultrasonic welding, it is possible to prevent erroneous operation of the current interrupt mechanism 2 and thus manufacture the battery 1 with high yields. It is further possible to reduce the influence of the ultrasonic vibration on the joint portion KG or the notch portion 64K and thus achieve a battery with the current interrupt mechanism 2 having less characteristic variation and high reliability.

In the method of manufacturing this battery 1, additionally, the positive current collecting foil 21s of the positive electrode sheet 21 is made of an aluminum foil. The positive internal conductive member 64 integrally including the positive current collecting member 64B and the first valve element 64A, and the second valve element 65 are made of damping iron-aluminum alloy, all of which contains the same metal element, aluminum. This allows good ultrasonic welding between the positive current collecting foil 21s and the leading end portion 64BS of the positive current collecting member 64B, and good laser welding on the joint portion KG between the first valve element 64A and the second valve element 65. Thus, the battery 1 can provide high reliability for those parts or portions.

The structure forming step in the manufacturing method of the battery 1 includes a step of welding the first valve element 64A of the positive internal conductive member 64 and the second valve element 65, which are made of the same damping iron-aluminum alloy. Since the welding in this embodiment is performed between the same material parts or components, high reliability of welding can be achieved. During ultrasonic welding, the ultrasonic vibration can be absorbed not only by the first valve element 64A (the positive internal conductive member 64) but also in the transmitting path from the first valve element 64A (the positive internal conductive member 64) toward the second valve element 65 via the joint portion KG. Accordingly, while the first valve element 64A and the second valve element 65 can be joined reliably to each other at the joint portion KG, it is possible to prevent breakage of the joint portion KG between the first valve element 64A and the second valve element 65 or breakage of the notch portion 64K in the current interrupt mechanism 2 due to the ultrasonic vibration during ultrasonic welding. This enables manufacturing the battery 1 with higher yields. The influence of the ultrasonic vibration on the joint portion KG or the notch portion 64K can be further reduced. Thus, the battery 1 can be provided with the more reliable current interrupt mechanism 2.

Moreover, the present manufacturing method of the battery 1 employs the first valve element 64A and the positive current collecting member 64B (the positive internal conductive member 64) which are integrally formed of the damping metal. Accordingly, it is not necessary to join the first valve element 64A and the positive current collecting member 64B by welding or other techniques. This can achieve cost reduction. Furthermore, the ultrasonic vibration can be absorbed not only by the first valve element 64A but also by the positive current collecting member 64B. It is thus possible to reliably reduce breakage of the joining between the first valve element 64A and the second valve element 65 at the joint portion KG or breakage of the notch portion 64K in the current interrupt mechanism 2 due to ultrasonic vibration during ultrasonic welding. The battery 1 can therefore be manufactured with higher yields. This makes it possible to further reduce the influence of the ultrasonic vibration on the joint portion KG or the notch portion 64K. Thus, the battery 1 can be achieved with the more reliable current interrupt mechanism 2.

Second Embodiment

Figure 6:
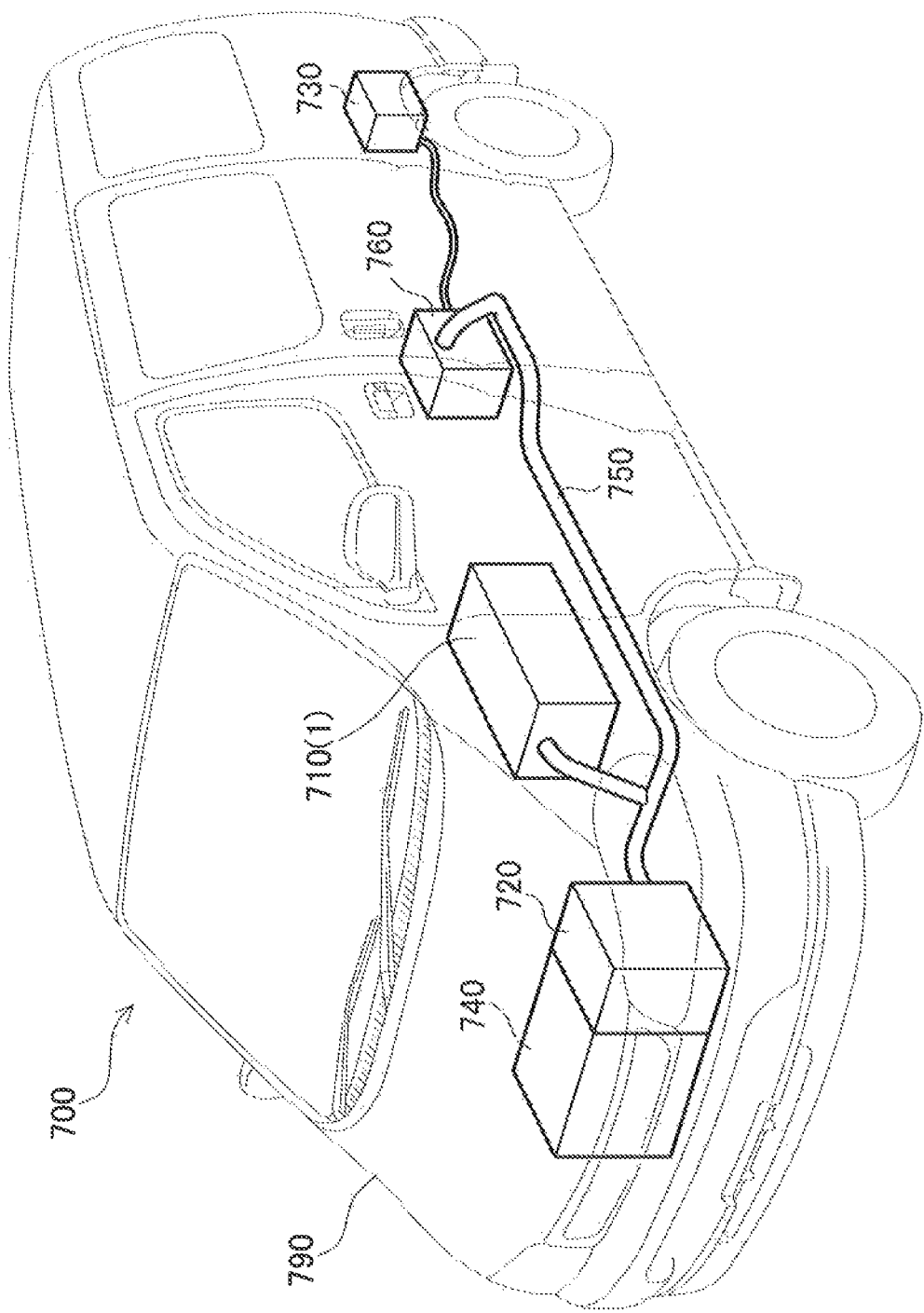
FIG. 6 is an explanatory view showing a hybrid vehicle in a second embodiment.

Next, a second embodiment will be explained. A hybrid vehicle (vehicle) 700 (hereinafter, also simply referred to as a vehicle 700) of the second embodiment mounts therein the battery 1 of the first embodiment to use the electric energy stored in this battery 1 for all or part of the drive energy of a drive source (see FIG. 6).

This vehicle 700 is a hybrid vehicle that mounts therein a battery pack 710 including a plurality of the batteries 1 and is driven by an engine 740, a front motor 720, and a rear motor 730 in combination. To be concrete, this vehicle 700 includes, in its vehicle body 790, the engine 740, the front motor 720 and the rear motor 730, the battery pack 710 (the batteries 1), a cable 750, and an inverter 760. This vehicle 700 is configured to drive the front motor and the rear motor 730 by use of the electric energy stored in the battery pack 710 (the batteries 1).

When the front motor 720 and the rear motor 730 of this vehicle 700 are to be driven, the battery pack 710 (the batteries 1) is used under inverter control using the inverter 760. Accordingly, the batteries 1 may be subjected to micro-vibration due to ripple current. However, in the batteries 1, as mentioned above, the positive internal conductive member 64 can absorb the micro-vibration caused by ripple current. The batteries 1 are therefore capable of reducing the influence of the micro-vibration on the durability of the current interrupt mechanism 2 and thus exhibits high reliability. The vehicle 700 mounting therein the batteries 1 can provide high reliability.

The present invention is explained in the above embodiments, but the invention is not limited to the above first and second embodiments. The present invention also may be embodied in other specific forms without departing from the essential characteristics thereof.

For instance, although the first embodiment uses the damping iron-aluminum alloy as the damping metal, any other damping metal, e.g., M2052 damping alloy, nickel-titanium alloy, and others may be used. In the first embodiment, the positive current collecting member 64B and the first valve element 64A are made in an integral member (the positive internal conductive member 64) and they are made of the damping iron-aluminum alloy the same as the second valve element 65. As an alternative, of the positive current collecting member 64B, the first valve element 64A, and the second valve element 65, at least the first valve element 64A has only to be made of the damping metal. In the first embodiment, the current interrupt mechanism 2 is provided in the positive terminal 60. Instead, it may be provided in the negative terminal 70.

The shape of the battery 1 in the first embodiment is rectangular, but may be cylindrical. The shape of the battery is not limited particularly. The first embodiment uses the electrode body 20 including the positive electrode sheet 21 and the negative electrode sheet 22 wound in a lamination form by interposing the separators therebetween. However, the configuration of the electrode body is not limited thereto. For instance, a lamination type electrode body may be adopted in which a plurality of positive electrode sheets and a plurality of negative electrode sheets are alternately laminated by interposing separators one each therebetween.

Although the second embodiment exemplifies the vehicle that mounts the batteries 1 according to the invention as the hybrid vehicle 700, the vehicle is not limited thereto. The vehicle that mounts the battery according to the invention may include for example electric vehicles, plug-in hybrid vehicles, hybrid railway vehicles, fork lifts, electric wheelchairs, electric bicycles, electric scooters.

REFERENCE SIGNS LIST

1 Lithium ion secondary battery (Secondary battery, Battery)
2 Current interrupt mechanism
10 Battery case 11 Case body member
12 Closing lid
20 Electrode body
21 Positive electrode sheet (Electrode sheet)
22 Negative electrode sheet
21s Positive current collecting foil (Current collecting foil)
22s Negative current collecting foil
60 Positive terminal
60K Structure
64 Positive internal conductive member
64A First valve element
64B Positive current collecting member (Current collecting member)
64BS Leading portion (of Positive current collecting member) (Ultrasonic welding portion)
65 Second valve element
67 Sealing stopper
KG Joint portion
70 Negative terminal
71 Negative external terminal
74 Negative internal conductive member
700 Hybrid vehicle (Vehicle)
710 Battery pack

The invention claimed is:

1. A secondary battery including:
an electrode body having an electrode sheet including a current collecting foil;
a current collecting member including an ultrasonic weld part connected to the current collecting foil of the electrode sheet by ultrasonic welding;
a pressure-type current interrupt mechanism conductively connected to the current collecting member; and
a battery case hermetically housing the electrode body, the current collecting member, and the current interrupt mechanism,
the current interrupt mechanism being configured such that
a first valve element integral with the current collecting member and a second valve element are joined to each other at a joint portion,
at least one of the first valve element and the second valve element is moved in a direction to break their joining when internal pressure of the battery case rises,
the current collecting foil, the current collecting member, the first valve element, and the second valve element are each made of a metal material containing a same metal element, and
at least a part between the ultrasonic weld part and the joint portion is made of damping metal, which is an alloy of the metal element and a dissimilar metal element different from the metal element.

2. The secondary battery according to claim 1, wherein the first valve element and the second valve element are made of the same damping metal and are joined to each other by welding to form the joint portion.

3. The secondary battery according to claim 1, wherein the first valve element and the current collecting member are formed of an integral member made of the damping metal.

4. The secondary battery according to claim 3, wherein
the current collecting foil is an aluminum foil, and
the damping metal is a damping iron-aluminum alloy.

5. The secondary battery according to claim 4, wherein the damping iron-aluminum alloy contains 6 to 10 wt % of aluminum and a reminder including iron and impurities.

6. The secondary battery according to claim 2, wherein the first valve element and the current collecting member are formed of an integral member made of the damping metal.

7. The secondary battery according to claim 6, wherein
the current collecting foil is an aluminum foil, and
the damping metal is a damping iron-aluminum alloy.

8. The secondary battery according to claim 7, wherein the damping iron-aluminum alloy contains 6 to 10 wt % of aluminum and a reminder including iron and impurities.

9. A method of manufacturing a secondary battery according to claim 1,
wherein the method comprises:
a structure forming step of forming a structure in which the first valve element made integral with the current collecting member and the second valve element are joined to each other at the joint portion; and
an ultrasonic welding step of ultrasonic welding the current collecting foil of the electrode sheet and the ultrasonic weld part of the current collecting member after the structure forming step.

10. The method of manufacturing a secondary battery according to claim 9, wherein
the first valve element and the second valve element are made of the same damping metal, and
the structure forming step includes a welding step of joining the first valve element and the second valve element by welding to form the joint portion.

11. The method of manufacturing a secondary battery according to claim 10, wherein the first valve element and the current collecting member are formed of an integral member made of the damping metal.

12. The method of manufacturing a secondary battery according to claim 9, wherein the first valve element and the current collecting member are formed of an integral member made of the damping metal.

* * * * *